United States Patent [19]

Harkness et al.

[11] 4,205,737
[45] Jun. 3, 1980

[54] CLUTCH-BRAKE MECHANISM FOR ROTARY MOWER ENGINES

[75] Inventors: Joseph R. Harkness, Germantown; Robert K. Mitchell, Brookfield, both of Wis.

[73] Assignee: Briggs & Stratton Corporation, Wauwatosa, Wis.

[21] Appl. No.: 830,116

[22] Filed: Sep. 2, 1977

[51] Int. Cl.² .......................................... A01D 69/10
[52] U.S. Cl. .................................. 192/17 R; 56/11.3; 192/103 B
[58] Field of Search ................... 192/12 R, 14, 103 B, 192/17 A, 17 C, 17 R, 17 D, 105 BA, 105 CD, 105 CE; 56/11.3, 11.7

[56] References Cited

U.S. PATENT DOCUMENTS

| | | | |
|---|---|---|---|
| 3,253,391 | 5/1966 | Meldahl | 192/17 R |
| 4,035,994 | 7/1977 | Hoff | 56/11.3 |
| 4,044,533 | 8/1977 | Wick | 192/17 R |

Primary Examiner—Rodney H. Bonck
Attorney, Agent, or Firm—Ira Milton Jones

[57] ABSTRACT

A completely enclosed combination clutch and brake mechanism permanently mounted at the bottom of a vertical shaft internal combustion engine of the type used to power rotary lawn mowers, is interposed between the crankshaft of the engine and a coaxial blade shaft projecting down from the bottom of the enclosed clutch and brake mechanism to have the cutting blade of the mower fixed thereto. A rotatable driving member fixed to the engine crankshaft and a rotatable driven member fixed to the blade shaft are drivingly coupled by radially outwardly movable clutch elements carried by the driven member and frictionally engaged with a radially inwardly facing circular surface on the driving member. Such frictional engagement results from the application to the clutch elements of both spring force and centrifugal force. The spring-force-produced frictional engagement effects transmission of rotation to the driven member from stand still to the speed at which the centrifugal-force-produced frictional engagement is capable of transmitting full engine torque to the blade shaft, but is incapable—due to slippage—of stopping the engine when the brake is applied, in which event rotation of the driven member is rapidly decelerated to zero.

6 Claims, 11 Drawing Figures

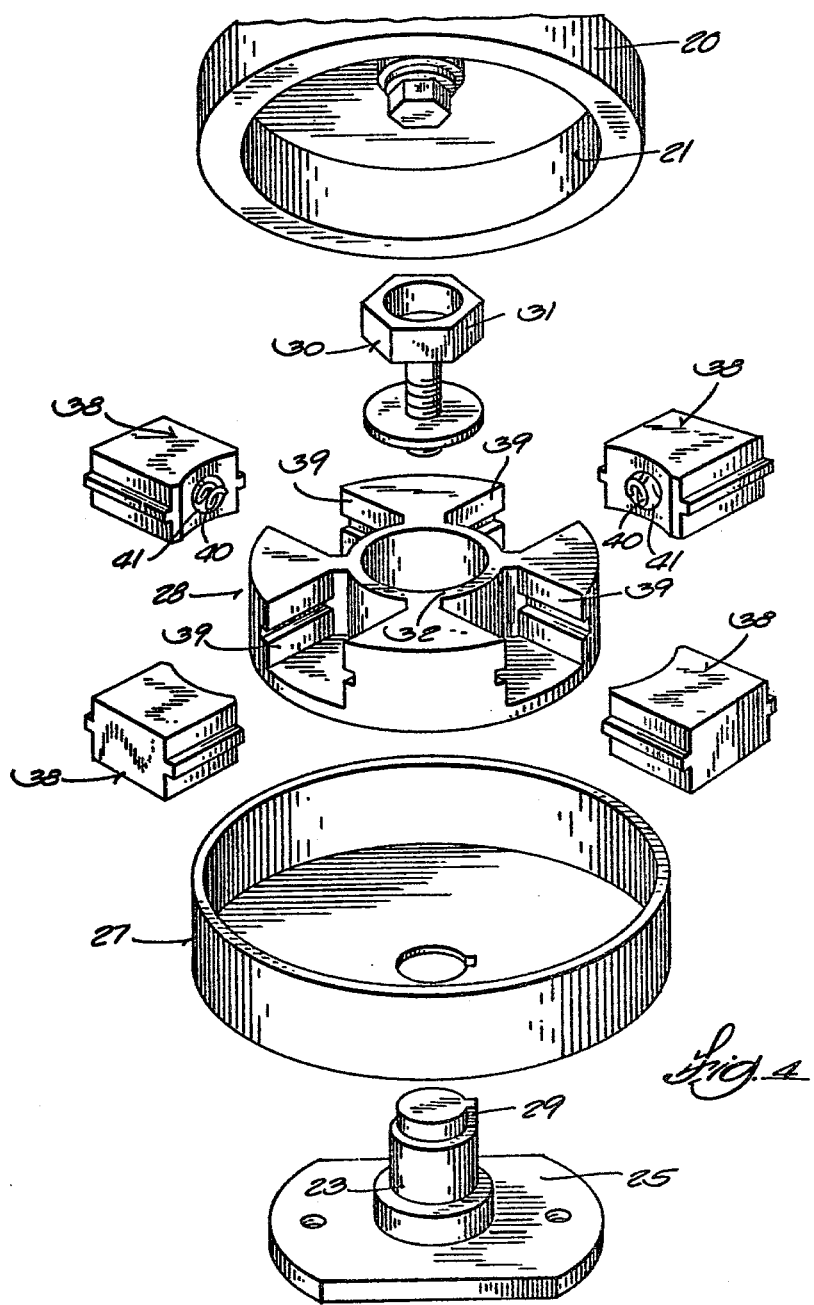

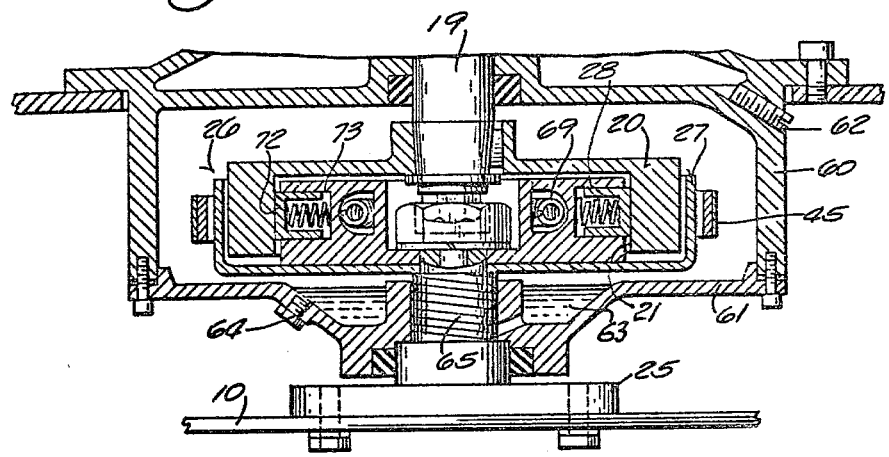
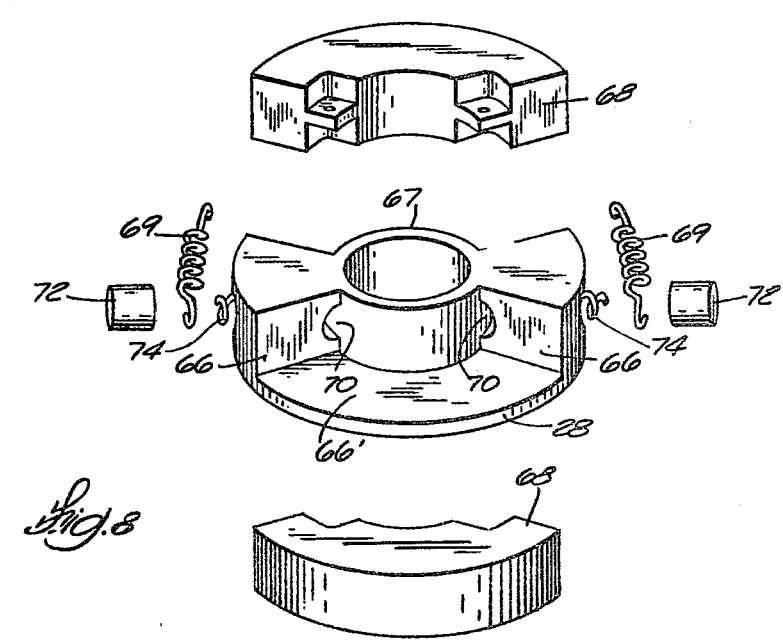

CLUTCH-BRAKE MECHANISM FOR ROTARY MOWER ENGINES

This invention relates to internal combustion engines used to power rotary lawnmowers, especially those of the walk-behind type, and has as its purpose and object to equip such engines with a reliable combination clutch and brake mechanism that quickly arrests rotation of the mower blade without stopping the engine, the instant the operator releases his grip on a deadman control that is mounted on the handle of the mower.

The general objective of making power mowers safer to operate through the provision of some means for quickly stopping the blade whenever the operator leaves his position at the handle of the mower, has received the attention of the industry for some time. Prior attempts to solve the problem fall into two categories, depending upon whether or not the blade is fixed to the drive shaft of the engine, as it is in many mowers. In that case, release of the deadman control stops or "kills" the engine. In the other, the blade is declutched from the engine and the application of a brake stops rotation of the blade upon release of the deadman control.

Stopping the engine by simply opening its ignition circuit as a consequence of release of the deadman control does not quickly enough remove the hazard of the rotating blade. There may be a time lag of four or five seconds between the instant the ignition is shut off and final stopping of the engine and of the blade fixed to its crankshaft. Recognition of the potential hazard in that delay led to the development of the brake mechanism of the Harkness U.S. Pat. Nos. 4,037,389 and 4,048,787. Those brake mechanisms are capable of practically instantaneously stopping rotation of the engine crankshaft.

But stopping the engine—no matter how it is done—requires easy re-starting for that approach to be an acceptable answer to the safety problem. Unless easy re-starting is a reliable reality, the temptation to deliberately deactivate the deadman control could soon defeat the safety measures that were built into the machine.

While use of the "clutch-brake" system to provide the desired safety obviates the need for easy re-starting—since in this case the engine does not stop when the deadman control is released—prior adaptations of that concept left much to be desired. For examples of such prior embodiments of the clutch-brake approach to the solution of the problem, reference may be had to the patents to Dowdle U.S. Pat. Nos. 2,985,992; Schmidt 2,993,329; Hoff 3,026,665; Meldahl 3,253,391; Mallion 3,837,450 and Shriver 3,871,159. None of these prior devices possesses the reliability and simplicity needed for satisfactory service as an essential component of a rotary power mower.

By contrast, the combination clutch-brake mechanism of this invention is the essence of reliable simplicity, and is so free of any inconvenience to the operator that its presence goes unnoticed.

In addition, the clutch-brake mechanism of this invention is reliably fail-safe. In the event of any possible breakage or failure of its control system, the mower blade is declutched from the engine and the brake is instantly applied to stop rotation of the blade.

An especially significant advantage of the clutch-brake mechanism of this invention stems from the fact that the clutch is maintained in engagement not only by centrifugal force but also by a spring force. The instant the brake is released, the spring force produces sufficient friction to impart initial rotation to the mower blade and rapid acceleration of that rotation to the speed at which centrifugal force holds the clutch engaged. And—when the brake is applied—rotation of the mower blade quickly decelerates despite the tendency of the engaged clutch to continue its rotation. As a result of this abrupt deceleration, the driving force on the blade due to centrifugal force becomes negligible and, although the spring-produced frictional driving force is not affected by that deceleration, the applied brake securely holds the blade against turning. And it does so without stopping the engine, since the spring-force-produced friction is not enough to keep the clutch from slipping.

This invention thus not only frees the engine maker of any concern for meeting "easy re-starting" requirements, but because it assures smooth resumption of blade rotation the instant the brake is released by the operator grasping the handle of the deadman control, and rapid acceleration to the speed at which centrifugal force maintains the clutch engaged, the invention presents no inconvenience to the operator tempting him to "tie-down" the handle of the deadman control.

Another very significant feature of the invention and one of its major objectives, resides in the fact that the entire mechanism is mounted on and becomes a part of the engine. Only the deadman control lever (which is mounted on the handle of the mower and which the operator must hold down to keep the clutch engaged and the brake released) and the Bowden wire connection between that lever and the clutch-brake mechanism are not a part of the engine. No one but the manufacturer of the engine is therefore responsible for the performance of the clutch-brake mechanism. The mower manufacturer simply mounts or installs the engine on the deck of the mower and appropriately connects the Bowden wire control cable thereto.

Not only does this incorporation of the clutch-brake mechanism into the engine eliminate all the irritating consequences of divided responsibility—as is so often the case when good performance depends upon the assembly of parts manufactured by different entities, it also assures complete protection and good lubrication for the entire clutch-brake mechanism.

To achieve the foregoing objectives, the invention resides in a novel and improved clutch-brake mechanism for drivingly connecting the blade of a rotary power mower with an engine mounted on the deck of the mower with its drive shaft vertical and accessible below the deck, and for abruptly stopping rotation of the blade without also stopping the engine; which comprises rigid structure fixed with respect to the engine at the underside thereof, and shaped to provide a cavity into which the engine drive shaft projects, said cavity having a bottom wall and a side wall; a blade shaft journaled in a bearing in the bottom wall of said rigid structure coaxially with the engine drive shaft, said blade shaft having means thereon to which a mower blade may be detachably secured; a rotatable driving member fixed to the engine drive shaft and located in said cavity, said driving member having an inwardly facing circular surface; a rotatable driven member fixed to said blade shaft and located in said cavity to impart rotation to the blade shaft when said driven member is rotating and to prevent rotation of the blade shaft when the driven member is restrained against rotation; clutch means carried by said rotatable driven member in position to frictionally engage the inwardly facing circular surface of said rotatable driving member, said clutch means being rendered operative by centrifugal force resulting from rotation of the rotatable driven member to effect a driving connection between said rotatable driving and driven members but only at speeds in excess of a predetermined magnitude, and by spring means incorporated therein, being maintained in frictional engagement with said inwardly facing circular surface with a force that is insufficient to stop the engine in the event rotation of said rotatable driven member is stopped, but strong enough to impart rotation to the rotatable driven member when the latter is not restrained against rotation, and to accelerate such rotation to the magnitude at which centrifugal force takes over; brake means mounted on said rigid structure and secured against rotation about the axis of the blade shaft, in position to engage said rotatable driven member; yieldable brake-engaging means operable when unrestrained to engage said brake means with said rotatable driven member and thereby stop rotation of it and the blade shaft; and remotely controlled means operatively connected with said brake means to hold the same disengaged from said rotatable driven member.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and modified embodiments of certain parts thereof, and in which:

FIG. 4 is an exploded perspective view of several of the major components of the clutch-brake mechanism shown in FIG. 2;

FIG. 7 is a view similar to FIG. 2, illustrating a somewhat modified form of the clutch-brake mechanism;

FIG. 8 is an exploded perspective view of the clutch means of that embodiment of the invention shown in FIG. 7.

Figure 1:
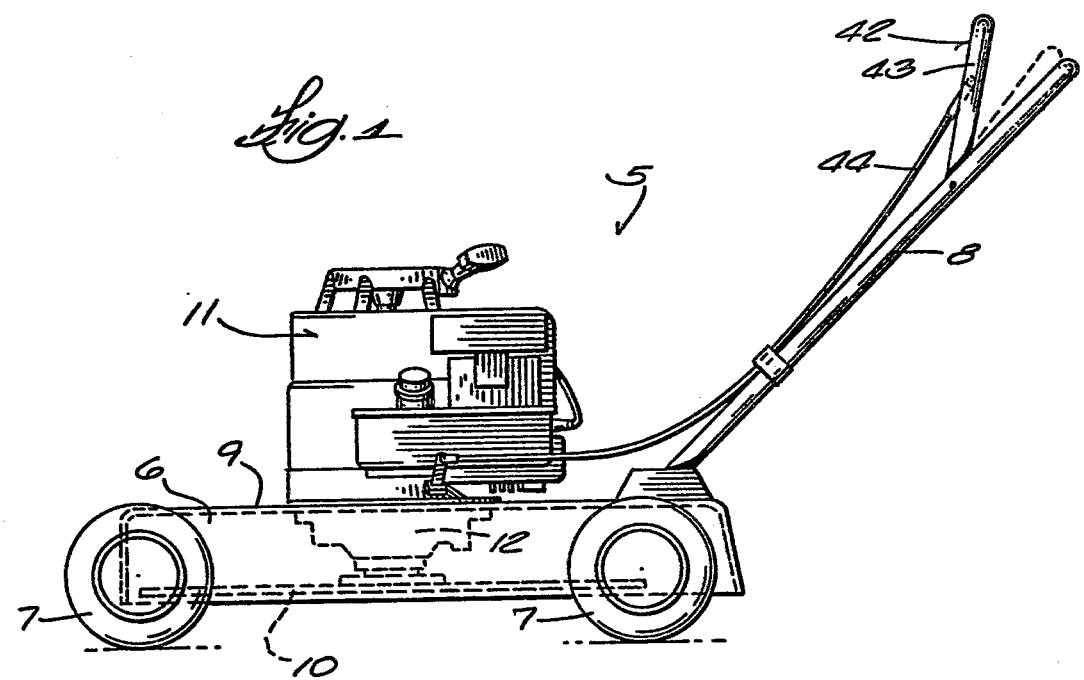
FIG. 1 is a side view of a rotary mower powered by an engine equipped with the combined clutch-brake mechanism of this invention.

Referring to the accompanying drawings, the numeral 5 designates a conventional walk-behind rotary power lawn mower which, as is customary, has an inverted pan-shaped body 6 mounted on wheels 7, and provided with a handle 8 by which the operator guides the mower as it moves across the lawn. At the underside of the body beneath its top wall or deck 9 is the rotary cutting blade 10 of the mower. An engine 11, which usually is of the vertical shaft, single cylinder variety, is mounted on the deck 9 and drivingly connectable with the cutting blade by the combined clutch-brake mechanism of this invention.

Figure 2:
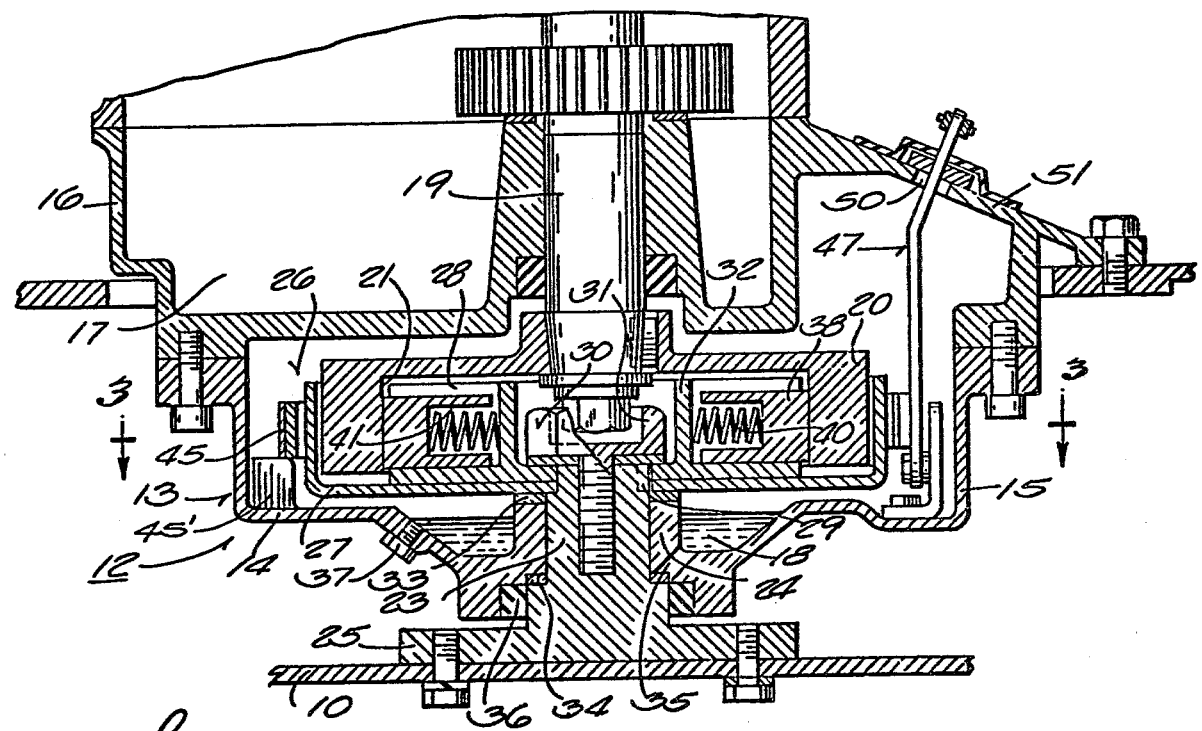
FIG. 2 is a vertical sectional view of one embodiment of the clutch-brake mechanism, and the adjacent part of the engine.
Figure 3:
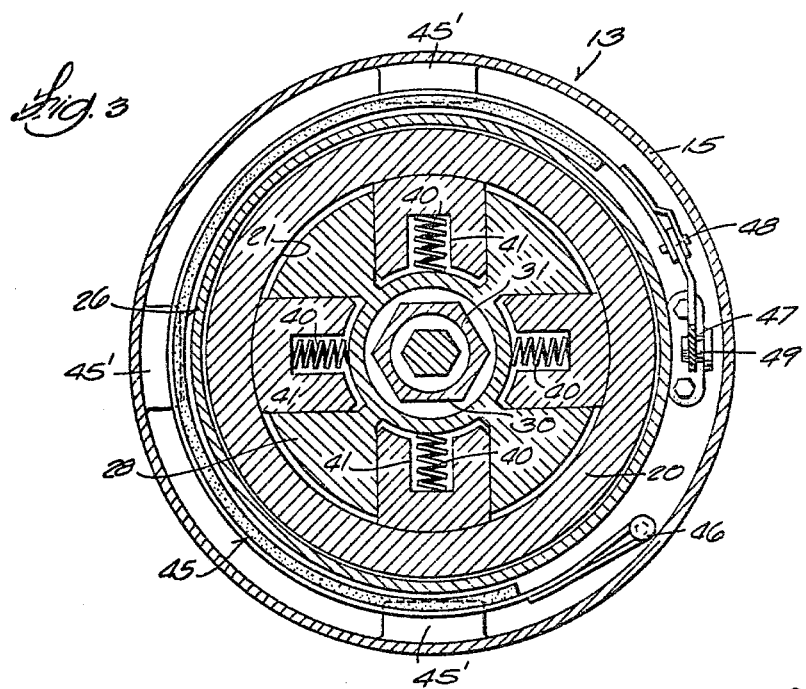
FIG. 3 is a horizontal sectional view of the clutch-brake mechanism shown in FIG. 2, taken substantially on the plane of the line 3—3 in FIG. 2.

This clutch-brake mechanism, which in FIGS. 1 and 2 is generally designated by the numeral 12 is contained within a case 13 that is solidly secured to the underside of the engine and hence is a part of the engine that is located beneath the deck of the lawnmower. In the embodiment of the invention illustrated in FIG. 2, the case 13 is a cup-shaped die casting with a bottom wall 14 and a side wall 15. The top of the side wall presents a flat surface that mates with and is secured to the underside of the engine crankcase sump 17, the side wall 16 of which forms a downward continuation of the crank case. Accordingly, the bottom wall of the sump coacts with the cup-shaped case 13 to define a completely closed enclosure, which not only protects the clutch-brake mechanism but also provides a reservoir 18 for a supply of lubricant.

Since the power output end 19 of the engine crankshaft protrudes from the bottom of the engine crankcase sump, it projects into the case 13 and has an inverted dish-shaped member 20 secured thereto. In a sense, this member 20 can be considered an auxiliary flywheel for the engine. From the standpoint of this invention, it is important to note that the member 20 has a radially inwardly facing circular wall surface 21. Being secured to the engine crankshaft, the member 20 constitutes a rotatable driving member for the clutch portion of the mechanism, from which rotation is imparted to a blade shaft 23 when the clutch is engaged.

The blade shaft 23 is journaled in a bearing 24 formed in the bottom wall 14 of the case coaxially with the engine crankshaft 19, and has a flange 25 at its lower end to which the cutting blade is detachably secured. Since the case 13 is secured to the underside of the engine by the engine manufacturer, coaxiality between the bearing 24 and the engine crankshaft is assured. The upper end of the blade shaft which extends a short distance beyond the top of the bearing 24, has a rotatable driven member 26 secured and keyed thereto.

Although the driven member 26 has two component parts—one a brake drum 27 and the other a clutch-shoe carrier 28, it can be considered a single entity. In any event, the two parts are secured against relative rotation by the same key 29 that holds the driven member against rotation with respect to the blade shaft; and both are fixed to the blade shaft by a bolt 30 that is threaded into the blade shaft with its head 31 clamped against the bottom of the cup-shaped hub 32 of the clutch-shoe carrier 28.

The assembled blade shaft and rotatable driven member 26 constitute a unit that is freely rotatable in the bearing 24 and held against axial displacement by thrust bearings 33 and 34. These bearings, and also the bearing 24, are supplied with oil from the reservoir 18 through a port 35; and to prevent leakage from the reservoir, a seal 36 is mounted at the bottom of the bearing 24. A capped filler port 37 provides for the introduction of oil into the reservoir.

Obviously a driving connection must be established between the coaxial driving and driven members 20 and 26, respectively, for the cutter blade to be driven by the engine. That driving connection is provided by an ingenious clutch means, about to be described. Although the specific form of that clutch means is subject to modification, as evidenced by the fact that several embodiments thereof are disclosed, regardless of its details, it has one significant feature. Both a spring force and centrifugal force are employed to engage and maintain the clutch engaged.

In the embodiment of the invention illustrated in FIG. 2, the clutch means comprises four circumferentially spaced plungers 38 slidably received in radially oriented guideways 39 formed in the clutch shoe-carrier 28. Coil springs 40 seated in pockets 41 in the radially inner ends of the plungers and bearing against the closed inner ends of the guideways yieldingly project the plungers into frictional engagement with the radially inwardly facing circular wall 21 on the driving member 20. The degree of torque transmitted by the frictional engagement of the plungers with the driving member, of course depends upon the strength of the springs—which is such that in the event rotation of the driven member is stopped, the resulting frictional resistance to rotation of the driving member will not stop the engine, though inevitably it will slow down.

Being free to move radially in their respective guideways, the plungers 38 are responsive to centrifugal force which augments the spring force acting thereon, and when the speed of rotation exceeds a predetermined magnitude centrifugal force becomes the dominant force and maintains full torque transmission from the engine to the cutter blade until the brake is applied. When that happens, the speed of rotation of the driven member is abruptly and rapidly reduced to the point at which centrifugal force is no longer a significant factor in the force holding the clutch engaged. In fact, beyond that point only the spring-produced frictional engagement of the clutch remains to produce driving torque between the driving and driven members, and that is not sufficient to stop the engine.

It should be appreciated, though, that because of the spring-force-maintained engagement of the clutch, rotation of the blade resumes the instant the brake is released, and in an extremely short time, full speed rotation of the blade resumes.

In keeping with the objectives of the invention, the application of the brake takes place the instant the operator releases a deadman control 42 mounted on the handle of the mower. This control comprises a pivoted lever 43 that is operatively connected with the brake by a Bowden wire 44.

The brake may take any suitable form, but preferably consists of a brake band 45 encircling the brake drum 27 and supported in a horizontal plane by a plurality of supporting ledges 45'. One end of the band is anchored to the case 13, as at 46. Its other end is attached to an actuating lever 47, as at 48. The actuating lever rocks about a fixed pivot 49 located within the case 13, and projects through a booted slot 50 in a top wall portion 51 of the engine crankcase sump 17. Here the lever is connected to the Bowden wire. A spring 52 which reacts between the pivoted brake controlling lever 47 and the case 13 automatically applies the brake the instant tension on the Bowden wire control cable is released, and since it is retention of the deadman control in its depressed position that maintains tension on the control wire, it follows that release of the deadman control results in application of the brake and concomitant disruption of an effective torque transmitting connection between the engine and the cutter blade.

Figure 6:
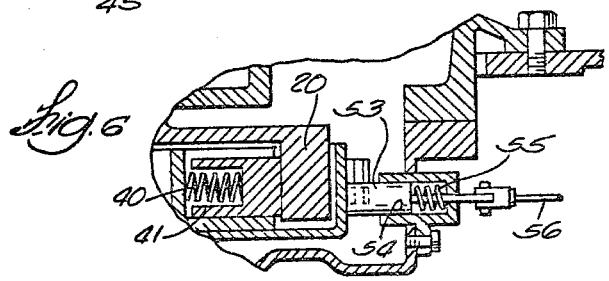
FIG. 6 is a fragmentary detail view illustrating another form of brake that can be used.
Figure 5:
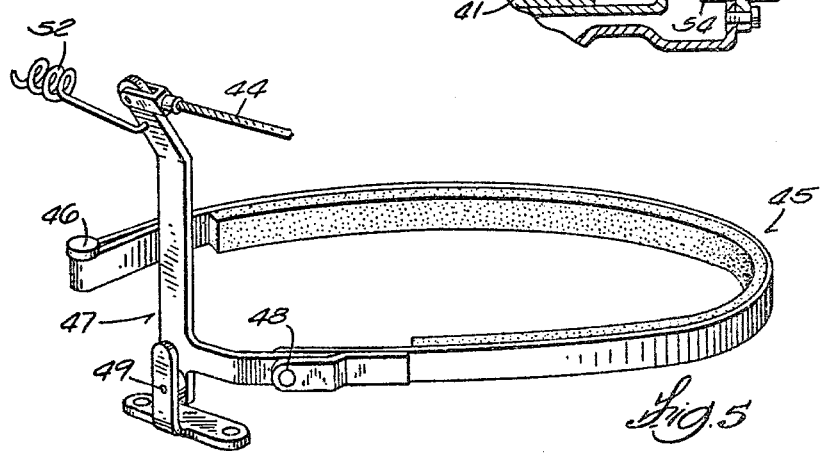
FIG. 5 is a detail perspective view of the brake used in the embodiment of the invention illustrated in FIG. 2.

Another form of brake that can be employed is illustrated in FIG. 6. Here the brake consists of a plunger 53 slidable in a guideway 54 in or on the side wall of the case 13. A compression spring 55 reacting between the plunger and the bottom of the guideway forces the plunger 53 against the brake drum whenever tension on a control cable 56 is released. As will be appreciated, the use of a spring to apply the brake, assures that blade rotation will be stopped whether the deadman control handle is released by the operator or the Bowden wire breaks; and if the spring is of the compression variety as it is in FIG. 6, braking would most likely occur even if the spring breaks.

The somewhat modified version of the clutch-brake mechanism illustrated in FIG. 7 differs from the one just described in very few respects. Perhaps the most significant difference resides in the fact that the enclosure for the mechanism, instead of being formed by the bottom of the crankcase sump and a cup-shaped member that is bolted to the underside of the sump, is formed by an encircling wall 60 integral with and projecting down from the peripheral portion of the bottom of the crankcase sump and a bottom cover plate 61 removably secured to the lower edge of the wall 60. This arrangement has the advantage of facilitating assembly of the structure and enabling use of a more convenient oil drain 62 for the sump. As before, oil can be introduced into the reservoir 63—which is formed in the cover plate 61—through a plugged inlet 64 which, of course, requires tilting the mower on its side when the reservoir is to be replenished.

Another feature of the embodiment shown in FIG. 7 is the provision of spiral oil grooves 65 in the blade shaft to carry oil to the upper end of the bearing in which the blade shaft is journaled. As in the embodiment of the invention illustrated in FIG. 2, the driven member 26 consists of two components, a brake drum 27 and a clutch-shoe carrier 28, but the latter component is of different design. As best seen in FIG. 8 it has diametrically opposite segment-like bosses 66 projecting radially from a hub 67 and connected by a circular flat web 66'. Between these bosses or abutments, and seated on the web 66', are two arcuate clutch shoes 68 that are drawn towards one another by a pair of tension springs 69 received in arcuate grooves 70 that extend across the segment-like bosses. Being circumferentially confined between these bosses, the clutch shoes of course are constrained to rotation with the carrier 26, but they do not become operative to transmit torque until the centrifugal force to which they are responsive overcomes the spring force holding the shoes out of contact with the radially inwardly facing circular surface 21 on the driving member.

However, since the clutch means must be capable of transmitting torque independently of centrifugal force, diametrically opposite friction elements or plungers 72 are slidably received in radially oriented pockets 73 in the segment-like bosses 66, and are forced outwardly by compression springs 74, into engagement with the driving member surface 21.

As in the embodiment of the invention shown in FIG. 2 a brake band 45 encircling the brake drum 27 holds the driven member and the cutter-blade against rotation despite the fact that the engine is running, until the operator grasps and depresses the deadman control lever.

Figure 10:
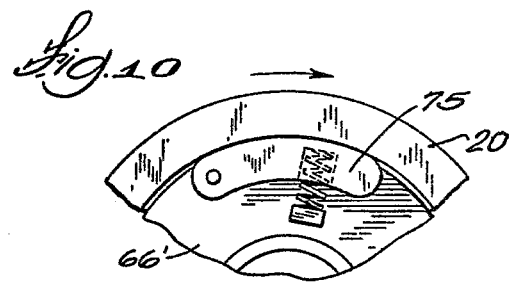
FIGS. 9 through 11, inclusive, are fragmentary plan views of different forms of clutches that could be used.
Figure 9:
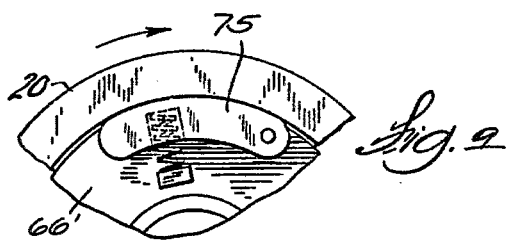
Figure 11:
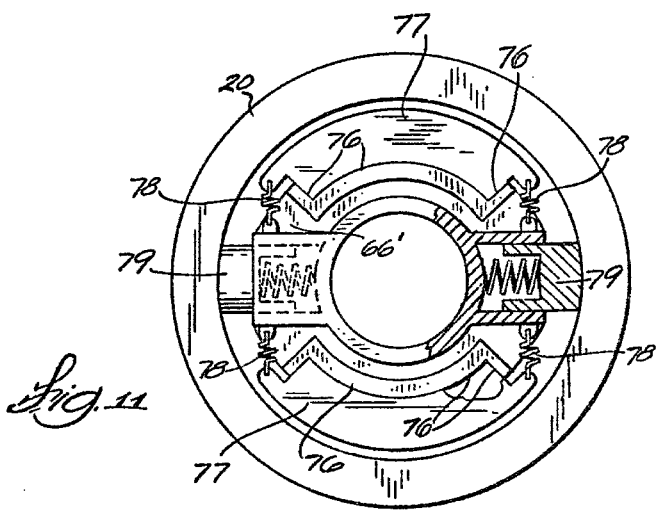

In lieu of the form in which the clutch means is embodied in the mechanism illustrated in FIGS. 2 and 7, any one of the embodiments thereof illustrated in FIGS. 9–11 can be used. Thus, as shown in FIGS. 9 and 10, the clutch shoes 75 can be pivoted directly to the web 66' of the clutch shoe carrier 28 and biased outwardly into frictional engagement with the circular wall on the driving member. In FIG. 9, the free end of the clutch shoe faces towards the input from the engine (indicated by the arrow) and hence tends to be self-energizing; in FIG. 10 the reverse is true.

In FIG. 11 the arrangement is similar to that of FIG. 8, in that diametrically opposite clutch shoes 77 nested in pockets provide the centrifugally responsive elements of the clutch; but in this case the wall portions 76 that define the pockets are not connected with the hub. Instead they project axially from the web 66' and tension springs 78 yieldingly hold the shoes from contacting the driving member until centrifugal force acting on the shoes overcomes these springs. Since the springs 78 prevent engagement of the clutch at low speeds, and since it is essential that there be some torque transmission at zero and low speed, spring-pressed plungers 79 that are slidable in radially oriented guideways in the driven member—and are forced outwardly by compression springs—provide that function. Hence the clutch arrangement of FIG. 11 is very much like that of FIG. 8.

Attention is directed to the fact that in some of the disclosed embodiments of the invention, the same radially movable clutch elements are projected into torque transmitting frictional engagement with the radially inwardly facing circular wall surface of the driving member by both spring force and centrifugal force—as in FIGS. 2, 4, 9 and 10, while in others, as in FIGS. 8 and 11, the clutch elements that respond only to centrifugal force are not the same as those that are maintained in torque transmitting operative condition by spring force. But, in either case, spring force and centrifugal force coact to achieve the purpose of the invention.

Those skilled in the art will appreciate that the invention can be embodied in forms other than as herein disclosed for purposes of illustration.

The invention is defined by the following claims.

We claim:

1. In a combination clutch and brake mechanism for drivingly connecting the blade of a rotary power mower with an engine mounted on the deck of the mower with its drive shaft vertical and projecting down from the bottom of the engine crankcase to be accessible below the deck, and for abruptly stopping rotation of the blade without also stopping the engine, the improvement which comprises:

A. rigid structure fixed with respect to the engine at the underside of its crankcase, and shaped to provide a cavity into which the engine drive shaft projects, said cavity having a bottom wall and a side wall and providing a reservoir for lubricant;

B. a blade shaft having means thereon to which a mower blade may be fixed;

C. a bearing fixed with respect to the bottom wall of said rigid structure and communicated with the interior of said cavity to receive lubricant from a supply thereof contained in said cavity,
said bearing being coaxial with the engine drive shaft and having the blade shaft journalled therein;

D. a rotatable driving member fixed to the engine drive shaft and located in said cavity, said driving member having a radially inwardly facing circular surface;

E. a rotatable driven member fixed to said blade shaft and located in said cavity to impart rotation to the blade shaft when said driven member is rotating and to prevent rotation of the blade shaft when the driven member is restrained against rotation;

F. centrifugally responsive clutch means on said rotatable driven member operable to engage the inwardly facing circular surface on said rotatable driving member and provide an effective torque transmitting connection between said driving and driven members at speeds in excess of a predetermined magnitude;

G. means reacting between said driving and driven members operable to effect a torque transmitting connection therebetween at speeds less than said predetermined magnitude with a force that is insufficient to stop the engine in the event said rotatable driven member is restrained against rotation, but strong enough to impart rotation to the rotatable driven member when the latter is not restrained against rotation, and to accelerate such rotation to the magnitude at which centrifugal force takes over; and H. manually controllable brake means mounted on said rigid structure and operable to engage said rotatable driven member and thereby stop rotation of it and the blade shaft.

2. The combination clutch and brake mechanism of claim 1, wherein said bearing is a bore through a boss rising from the bottom wall of said rigid cavity.

3. The combination clutch and brake mechanism of claim 2, further characterized by:
means providing lubricant feeding communication between said bearing and the interior of said cavity.

4. The combination clutch and brake mechanism of claim 2, wherein the cavity provided by said rigid structure has its top closed by the bottom of the engine crankcase, and
wherein the bottom wall of said cavity is detachably secured to the side wall of the cavity.

5. The combination clutch and brake mechanism of claim 1, wherein said rotatable driven member has a substantially flat web normal to its axis, a coaxial hub rising from said web and segment-like abutments fixed to said web, and
wherein the centrifugally responsive clutch means comprises a pair of diametrically opposite shoes embracing said hub between said segment-like abutments for radial motion into and out of frictional engagement with the inwardly facing circular surface of the rotatable driving member.

6. The combination clutch and brake mechanism of claim 5, wherein said means (paragraph G of claim 1) to effect a torque transmitting connection between the driving and driven members at speeds less than said predetermined magnitude comprises a plunger slidably mounted in a radially oriented pocket in each of said segment-like abutments, and a compression spring confined between each of said plungers and the bottom of the pocket in which it is mounted.

* * * * *